A. VREELAND.
Self-Loading Carts.

No. 157,557.                                         Patented Dec. 8, 1874.

Witness
Horace Harris
Wm. H. Seely

Inventor
Aaron Vreeland

United States Patent Office.

AARON VREELAND, OF MONT CLAIR, NEW JERSEY.

IMPROVEMENT IN SELF-LOADING CARTS.

Specification forming part of Letters Patent No. 157,557, dated December 8, 1874; application filed August 17, 1874.

*To all whom it may concern:*

Be it known that I, AARON VREELAND, of Mont Clair, in the county of Essex and State of New Jersey, have invented an Adjustable Self-Loading Cart, of which the following is a specification:

My invention consists in hanging a cart-body, made in form of a large scoop, by means of chains or ropes and rods, to a frame and to an axle, so that it may be let down behind the axle and take up a load of earth, and be returned to a carrying position, where it is borne along to the place of dumping.

Figure 1:
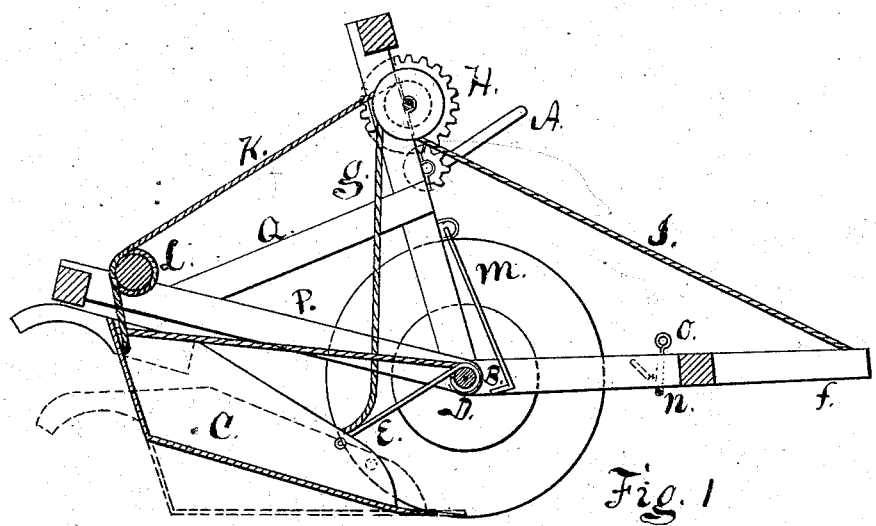
Figure 2:
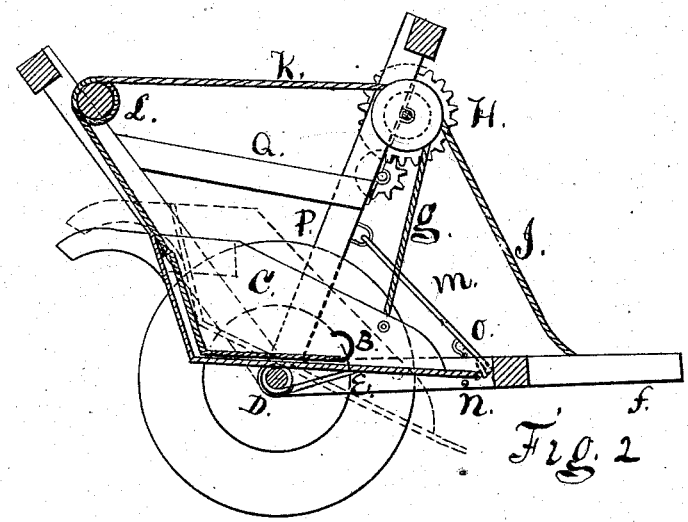

In the drawings, Figure 1 is a side elevation, in which the cart-body is in position to be filled. Fig. 2 is the same, with the body loaded and in its carrying position.

The mode of using, which will explain the construction, commences with a man on each side to turn at a crank, A. The first thing done is, the hooks B in the chains, made fast to the rear end of the body C, are secured or hooked onto the axle D, to help the rods E to hold the body or scoop firm in the ground while it is being filled. In this position the cart is drawn along by a horse in the shafts f, until from the loose earth the body is loaded. The horse or team is then stopped, and the chains or hooks B are loosened, and each man turns at the crank on his side of the cart.

The first motion of the crank, as seen in Fig. 1, is downward. This winds up the chains g, which connect with the windlass H and front end of the body, and also the chains I, connected at the same point with the windlass and the shafts. It also winds up the chains K, which run back and slip on the roll L, and from thence to the rear end of the body, which help to balance and move the body. This motion downward on the cranks is continued until the body is raised up to a center over the axle, when by one of the men it is pushed forward past the center, and the rods M are hooked to the shafts. The motion of the cranks is then reversed, and the body, by the action of the chains, is thrown forward and settles down upon the axle, and the front end on a chain, N, or bar between the shafts. When the cart is at the place of dumping the pin O is withdrawn, or other fixture is removed, and the front end of the body drops down and dumps the contents.

To restore the body to its position for another load the action on the cranks is the same as at the first—turn the handles down until the body is again at the center, when, by a hand, it is assisted past the center, and, the motion being reversed, the body settles down again to the earth, and the rods M are unhooked.

The frame P, for holding the windlass and roll and other parts, is made together by the stay Q, and the whole turns on the axle, in the action of elevating and depressing the body, by the working of the cranks and chains.

Thus a cart is constructed with an adjustable body to receive and carry and unload the earth, operated simply by the cranks and chains, as shown.

Some variations may be made in the exactness of detail, and yet the same principle be preserved, and so, in the general, I claim, but more particularly

I claim—

1. The adjustable cart-body C, hung to the axle D, and operated by the cranks A, with the connecting-chains g, I, and K, in combination with the roll L, hooks B, and rods M, substantially as and for the purposes specified.

2. The adjustable chain N, or equivalent, for the purpose of holding or dumping, substantially as set forth.

AARON VREELAND.

Witnesses:
HORACE HARRIS,
WM. H. SEELY.